Jan. 6, 1970   C. T. WALTERS ET AL   3,488,682

BEARING SEAL LIP MEASURING APPARATUS

Filed May 17, 1967   3 Sheets-Sheet 1

INVENTORS:
CRAIG T. WALTERS
CHARLES M. ALLEN

BY Gravely, Lieder & Woodruff

ATTORNEYS.

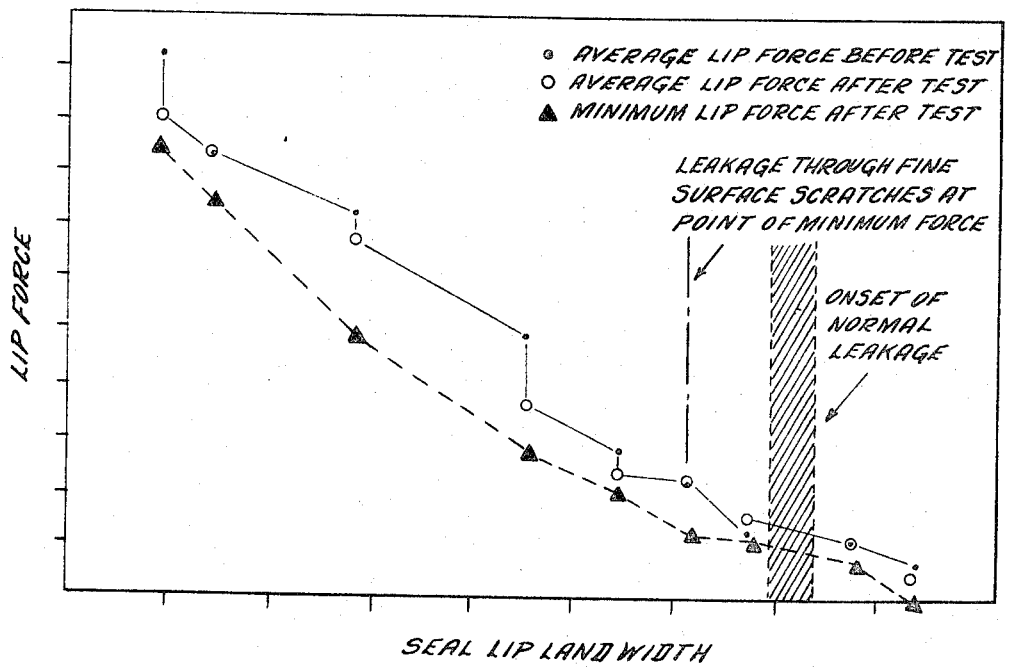
FIG. 5 STATIC ROOM TEMPEATURE LIP FORCE FOR SEAL OPERATED AT DIFFERENT STAGES OF WEAR
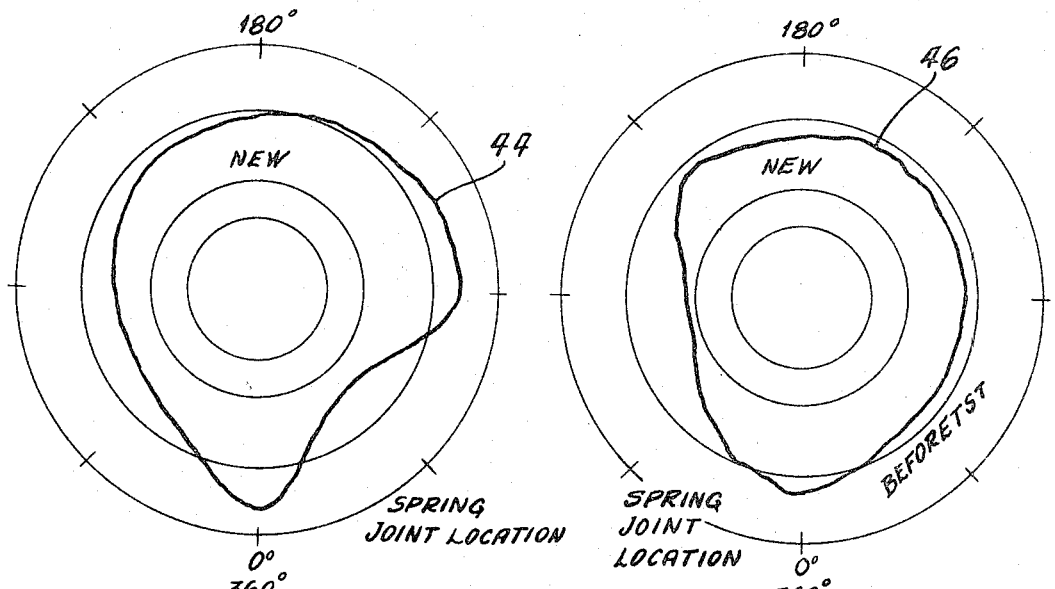
FIG. 6 LIP FORCE FOR PRODUCTION SEAL
FIG. 6A LIP FORCE FOR PRODUCTION SEAL

United States Patent Office 3,488,682
Patented Jan. 6, 1970

3,488,682
BEARING SEAL LIP MEASURING APPARATUS
Craig T. Walters and Charles M. Allen, Columbus, Ohio, assignors to The Timken Roller Bearing Company, Canton, Ohio, a corporation of Ohio
Filed May 17, 1967, Ser. No. 639,169
Int. Cl. G01n 3/08
U.S. Cl. 73—88       5 Claims

ABSTRACT OF THE DISCLOSURE

Apparatus by which the integrity of a bearing seal lip may be rapidly and accurately measured in terms of the force exerted by the seal lip upon a movable segment of a simulated seal carrying sleeve. The movable segment of the sleeve is carried upon a bendable pedestal having strain gauges thereon to detect the lip forces and determine when the segment is properly aligned. The apparatus includes means to determine the distribution of the seal lip force on the movable segment and to effect movement of the segment by a read-out device which determines the alignment of the segment of the simulated sleeve. In the apparatus the read-out device is coupled to a variable resistor such that the voltage at the slide wire is directly proportional to the adjusted position of the read-out device and is therefore sensitive to the position of the movable segment from its desired position. The value of the current and the relative adjustment of the device are calibrated to give a numerical value of the seal lip force through the voltage reading in a digital voltmeter.

---

This invention relates to improvements in means and apparatus which will permit accurate measurement of circumferential lip seal force in seals for anti-friction bearing assemblies and relates in particular to a new and novel apparatus for the accurate determination of such a lip seal force.

In roller bearing assemblies wherein an inner sleeve or cone is caused to rotate relative to an outer sleeve or cup and tapered rollers are disposed to rotate therebetween to reduce friction, the rollers, cup and cone must be supplied with a lubricant to prevent excessive heat and wear. In many anti-friction bearing applications it is necessary to provide seals at either end of the bearing assembly to prevent excessive loss of lubricant.

For example, tapered roller bearing assemblies, for railway vehicles are positioned on the extending hubs of the integral axle, spaced wheels and hub assemblies. The car frame rests on the outer cylinders of the bearing assemblies so that the integral wheel units rotate through such bearing assemblies relative to the car body. Circumferential lip seals such as those disclosed in copending U.S. patent application Ser. No. 505,635, Charles M. Allen, "Circumferential Lip Seals for Rotary Shafts" (now abandoned) are positioned at either end of the bearing assembly to prevent or retard lubricant from leaking from the assembly. These seals comprise circular elastomer members mounted for relative rotation with the outer sleeve and formed with an inwardly extending lip that is disposed to bear on the surface of the rotating hub or a wear ring to prevent the escape of lubircant from the assembly. A second lip may also extend to the hub or wear ring, outwardly from the lubricant sealing lip, to exclude dust or dirt from penetrating to the bearing assembly.

Such elastomer seals vary in their resistance to wear and in their elastomeric properties, such resistance and properties being dependent on the elastomer or rubber composition utilized, the degree of cure, etc. These properties may vary from lot to lot of lip seals so that it is necessary to test each lot to ascertain if these seals meet acceptable standards of quality.

From the inspection of seals taken from service, it has been determined that one important mechanism that contributes to seal degradation is the relaxation and hardening of the seal material. These mechanisms cause a decrease in the seal material component of lip force to the extent that the total lip force diminishes to zero. Clearly, it is of primary importance to maintain a positive lip force upon the wear ring inasmuch as sealing cannot be maintained with a microscopic interfacial gap.

The necessity for evaluation of the integrity of elastomer seals for roller bearing assemblies has resulted in the introduction of new methods of measurement. Oil seals are presently evaluated by a multitude of parameters such as seal lip eccentricity and seal lip material hardness.

One leading test for seal lip pressure integrity is referred to as lip opening pressure (L.O.P.). This technique involves apparatus and methods whereby pressure is applied to the sealing member in a manner to break the seal between the shaft bearing surface and the seal lip.

One method for measuring L.O.P. consists of forcing air into the cavity behind the lip under increasing pressure until it flows past the lip at 10,000 cc./minute. The pressure at 10,000 cc./minute flow rate is then observed and recorded as L.O.P.

None of the prior art methods render an accurate measurement of the ability of any given elastomer seal to maintain seal pressure on a shaft surface. The commonly utilized L.O.P. measurements are a measurement of the average ability of the seal to resist internal gas pressure rather than measurement of the force the seal is applying to such a surface at a given point on the circumference. Such elastomeric properties are not necessarily a true evaluation of the integrity of the seal.

Seals which exhibit satisfactory L.O.P. or average lip force often fail in service because they have a low minimum lip force at a given point on their circumference. At the point of minimum lip force loss of lubricant may be excessive. Consequently, the present apparatus provides a means whereby measurements of lip force can be taken at various points around the circumference of the sealing lip.

It is, therefore, the object of the present invention to provide an accurate means for measuring the lip force the elastomer seal provides on its seal bearing surface in a roller bearing assembly.

It is also an object of the present invention to provide a means whereby measurements of the lip force of elastomer seals can be taken at various points around the circumference of the sealing lip.

A further object of the present invention is to provide an apparatus for measuring the lip force of an elastomer seal that consists of a simulated circumferential bearing surface formed with a displaceable segment, said apparatus being provided with means for determining when the segment is aligned with the bearing surface and means for determining the force required to maintain the segment so aligned when subjected to the force of a seal lip bearing thereon, such latter determinations being an accurate lip force measurement.

Other objects and advantageous features will be obvious from the following description and the drawings wherein.

Figure 3:
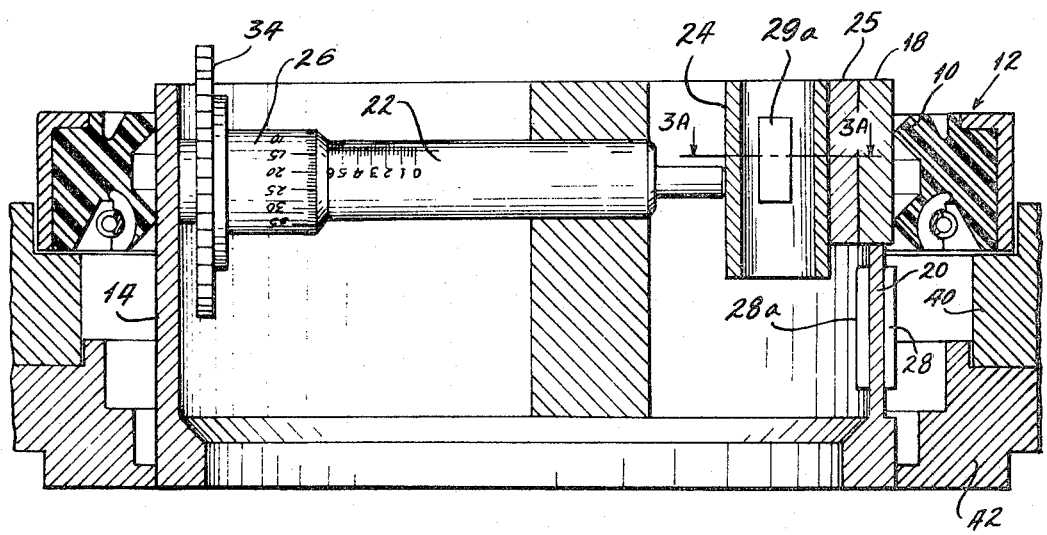
FIG. 3 is a sectional view taken at line 3—3 in FIG. 2 of the apparatus of the present invention showing a seal in place.
Figure 4:
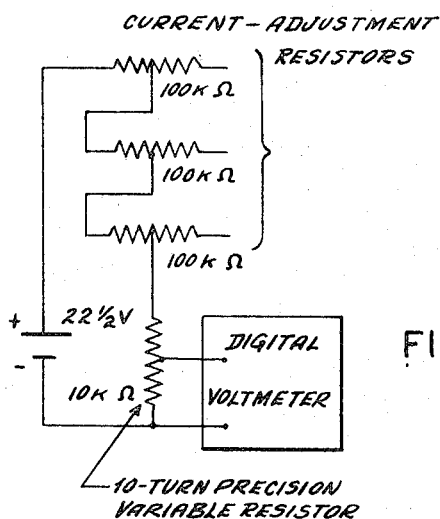
Figure 3A:
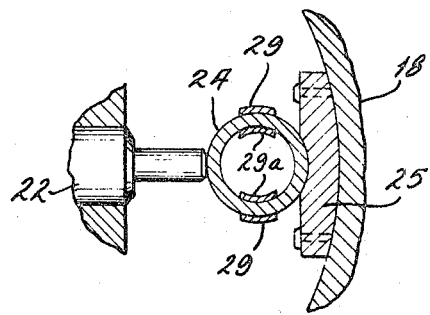

FIG. 3A is a fragmentary sectional plan view taken at line 3A—3A in FIG. 3 to show the proving ring mounting and strain gauge assembly;

FIG. 4 is a circuit diagram illustrating a micrometer head or shaft read-out system for the apparatus of the present invention;

FIG. 5 is a graph showing lip force behavior as a function of wear in a seal for a typical railway bearing assembly; and FIGS. 6 and 6A show illustrative circular graphs of lip force as measured with the apparatus of the present invention, plotted around the circumference of two seals for railway bearings to show circumferential variations detected by the present invention.

In general the present invention consists of apparatus for measuring the sealing force existing in the lip of a circumferential elastomer seal when in contact with a shaft surface. A simulated cylindrical bearing surface is aligned with the simulated surface and means are provided to determine the force required to maintain the displaceable segment in the aligned position, said force being equal to and oppositely directed to the force exerted upon the displaceable segment by the seal lip bearing thereon.

Elastomer seals for railroad tapered roller bearing assemblies are found to frequently exhibit poor contact with the wear ring of the assemblies although there remains sufficient lip material to allow for more wear. This phenomenon is attributed to the aging properties of the involved elastomer. In service these seals are subjected to time-tempertaure environments that tend to harden and stiffen the lip material. In the utilization of spring reinforced elastomer seals such as those described in copending patent application Ser. No. 505,635, Charles M. Allen (now abandoned) a point in wear life is reached where the spring force can no longer overcome the circumferential compressive force in the seal material and the pressure contact on the bearing surface or wear ring drops to zero. At this time, sealing effectiveness rapidly declines as the gap opens up from additional intermittent wear.

Figure 1:
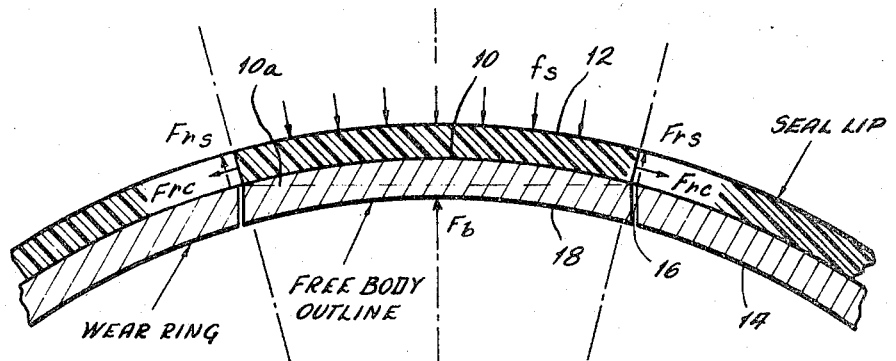
FIG. 1 is a fragmentary portion of an illustrative model that is utilized to demonstrate the principle of operation of the device of the present invention.
Figure 2:
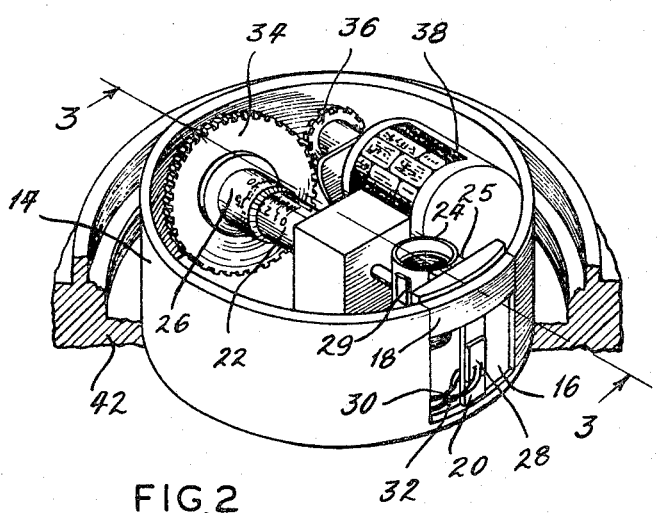
FIG. 2 is a perspective view of a force measurement apparatus constructed in accordance with the present invention.

To avoid the continued use of such defective seals and to provide a meaningful test to evaluate elastomer seals the apparatus of FIG. 2 was devised. The basic concept for the force measuring device is best described by the illustrative model of FIG. 1.

The measurement performed by the present apparatus consists of observing the total force required to hold a movable wear-ring segment in line with the rest of the wear ring (or simulated wear ring) upon which a seal is placed. In FIGS. 1 and 3, 14 is a simulated wear ring, 16 is a void area in the wear ring 14, 18 is a movable segment positioned to fill the gap 16, 12 is an elastomer seal and 10 is the sealing lip that bears on both ring 14 and segment 18. If the segment were not present in the gap 16 the seal lip 10 would have the tendency to stretch across the gap and assume an approximate position depicted by the dash line 10a.

The effective force of interest in the seal configuration is the total distributed radial load at a given point, i.e. that force per unit length of circumference exerted by the lip 10 upon the surface of the wear ring 14 (including segment 18). For a free body segment of finite length, the total force on the segment is equal to that given in the figure as $F_b$. If the measurement of $F_b$ is performed with the segment aligned with the remainder of the wear ring, the radial shear force, $F_{rs}$ in the seal material will be zero and $F_b$ is directly related to the distributed spring force load $f_s$, and the seal material circumferential force $F'_{rc}$ here shown in tension. The relations for a segment angle $\alpha$, are as follows:

$$F_b = F'_{rc} + F'_s \quad (1)$$

where the primes indicate components of force along the symmetry axis of the segment.

From the figure it can be seen that $$F'_{rc} = 2F_{rc} \sin \frac{\alpha}{2} \quad (2)$$

By integrating the distributed spring load, the force component due to the spring can be determined. The contribution to the force component by a small angular increment of segment, $d\theta$, may be written:

$$dF'_s = (f_s \cos \theta)(r d\theta) \quad (3)$$

where $r$ = outside radius of wear ring

Thus $$F'_s = \int_{-\alpha/2}^{+\alpha/2} (f_s r \cos \theta) d\theta \quad (4)$$

$$F'_s = 2 f_s r \sin \frac{\alpha}{2} \quad (5)$$

Comparison of Equations 5 and 2 suggests defining an effective radial distributed load for the circumferential seal material force $$f_{rc} \equiv \frac{F_{rc}}{r} \quad (6)$$

Combining Equations 1, 2, 5, and 6, one has $$F_b = (f_{rc} + f_s) \, 2r \sin \frac{\alpha}{2} \quad (7)$$

If the total radial distributed load is defined as $$f_t = f_{rc} + f_s \quad (8)$$

then $$F_b = f_t \left( 2r \sin \frac{\alpha}{2} \right) \quad (9)$$

Equation 9 relates a measured force $F_{b'}$ to the total radial distributed load $f_t$, for a given ring radius $r$, and segment angle $\alpha$. Note that $f_t$ can be separated into its components $f_{rc}$ and $f_{s'}$, by measuring $F_b$ with an without the spring in place.

The apparatus of FIGS. 2 and 3 is composed of a sealing ring 14 that is formed with a gap or cut out portion 16. A ring segment 18 is positioned within the cut out portion 16 and is of appropriate semicircular configuration for alignment with the outer surface of the ring 14 and is so aligned. Segment 18 (FIGS. 3 and 3A) is supported within the cut out portion 16 by a resilient pedestal 20 which is attached to the bottom of the cut out portion 16 and segment 18 or which is an integral part of one or both these members.

There is mounted within ring 14 micrometer head or beam 22. The micrometer head 22 engages or bears upon a proving ring 24 which, in turn, bears through a demountable block 25 upon segment 18 so that rotation of micrometer handle 26 exerts outward pressure on segment 18 causing bending strain on pedestal 20 and compressive strains on proving ring 24.

Strain gages 28 and 28a are positioned on either side of pedestal 20 in a manner to detect and measure the bending strain imposed on this member by micrometer head 22 through the proving ring 24. Leads 30 and 32 carry the strain measurements from gages 28a and 28 respectively to appropriate impulse measuring devices, such as an oscillograph (not shown), that will permit evaluation in the manner described herebelow.

Proving ring 24 may be provided with strain gages such as gages 29 and 29a so that in operation an elastomeric bearing seal may be positioned on the bearing surface of ring 14 so that the sealing lip 10 contacts segment 18. Micrometer head 22 is rotated and retracted so that pressure is not applied to proving ring 24. Pressure on segment 18 by the seal lip 10 will urge the segment inwardly and impose a strain on pedestal 20. Rotation of micrometer head 22 so as to advance the head to abut and apply pressure to proving ring 24, urges segment 18 forward towards alignment with circumferential surface of ring 14.

The pressure supplied by the sealing lip 10 causes a measurable strain on pedestal 20 and this strain is detected by strain gages 28 and 28a and transmitted to a strain readout instrument such as an oscillograph. As pressure is applied by the micrometer head 22, the degree of strain imposed on pedestal 20 diminishes and when the segment 18 is aligned with ring 14 no recordable strain is detected. In this manner, it may be accurately ascertained when the outer surface of segment 18 is aligned with the circumferential surface of ring 14.

As micrometer head 22 applies pressure to ring 24 in urging segment 18 into alignment with ring 14, increasing strain is imposed on proving ring 24. The strain applied to ring 24 is measurable. Strain gages such as gages 29 and 29a attached to ring 24 are attached to read-out devices (not shown). Such strain increases as micrometer head 22 is advanced to return segment 18 into alignment with ring 14. Thus, when the readout device indicates that segment 18 is aligned the measurement of strain imposed on providing ring 24 is a valid determination of the force being applied by the seal lip 10 to the segment 18.

Although any standard commercial strain gage of appropriate size may be used, we have employed the standard commercial SR-4 gages. An oscillograph has been used as a read-out instrument. A typical seal measurement consists of the following steps:

(1) The micrometer head 22 was backed away from the proving ring 24.

(2) The seal 12 was placed on the measuring wear ring 14 in an adapter 40 suitable to the style and size of seal. The seal and adapter were then supported in test position by the base member 42. The movable segment 18 tended to deflect inwardly as a result of the force imposed by the seal lip 10.

(3) The micrometer head 22 was advanced outward against the proving ring 24 which deflected and transmitted a force to the movable segment 18 which also deflected. The micrometer was advanced until the wear ring segment went beyond the aligned position, then it was returned.

(4) Step 3 was repeated several times producing simultaneous, oscillograph traces of the proving ring and segment deflections.

(5) Proving-ring deflections were read from the traces at points where the segment deflection trace indicated alignment.

(6) These deflections were averaged and converted to lip force by use of a calibration curve.

(7) The seal was removed, indexed 45°, and replaced on the wear ring 14. Steps 1–6 were repeated and in like manner the lip force was obtained at eight seal positions (FIG. 6).

Although the above instrument has been found to be of particular value in effecting the measurements, we have found it to be possible to eliminate Steps 4–6 by measuring the proving ring deflection by micrometer shaft angular position and displaying the result in a digital display in terms of lip force.

Any convenient shaft position read-out of appropriate sensitivity, stability, and adjustability can be used. In the device of FIG. 2, micrometer head 22 was coupled through spur gears 34 and 36 to the shaft of a ten-turn precision variable resistor (Helipot) 38. In this device, one-quarter turn of the micrometer shaft (0.00625-in. proving-ring deflection) produces one full turn of the resistor shaft. A constant, but adjustable, current is maintained through the resistor such that the voltage at the slide wire is directly proportional to the micrometer shaft position and in turn the proving ring deflection.

The circuit diagram of the micrometer head position read-out device is shown by FIG. 4. The value of the current and the relative micrometer head positions are adjusted so that a numerical value of the lip force may be obtained directly from this voltage as displayed on a Hewlitt Packard 4-digit digital voltmeter.

The strain gages indicating the movable wear ring segment position are preferably monitored by a strain indicator rather than the oscillograph. The bridge is balanced when no forces are acting on the segment such that a null meter reading indicates alignment. With these innovations a lip force measurement at a single seal position proceeds very rapidly and there is less chance for error. The micrometer is simply advanced until the strain indicator indicates a null reading and the lip force is copied from the voltmeter in digital form.

In the utilization of the apparatus of FIG. 2, segment 18 is positioned so that an elastomer sealing assembly 12 fits over the simulated wear ring 14 with the sealing lip 10 contacting the segment 18. The adapter 40 centers the assembly over the ring 14 of the instrument of FIG. 2 so as to hold the sealing assembly to the simulated wear ring 14 much in the manner such a member is mounted within a bearing assembly. The seal is not held so rigidly that it may not be rotated on the ring 14 because it has to be indexed for measuring the seal lip integrity around its circumference.

It will be appreciated that in utilizing the device of FIG. 2, it is not essential that segment 18 be depressed prior to returning it to alignment with the surface of ring 14 and prior to measuring the strain of proving ring 24, although such procedure may be preferred. Segment 18 can be extended beyond the surface of ring 14 so that the pressure of the elastomer sealing lip would not return it to alignment. When so aligned, however, zero strain would be indicated by the pedestal 20 and the strain exhibited by proving ring 24 would be a valid indication of lip force integrity.

An illustration of typical seal lip force behavior as a function of wear is shown by the data of the graph of FIG. 5. This graph shows plots of the average lip force of an elastomer seal which was mounted to the shaft of a test apparatus disposed to simulate actual seal wear conditions imposed in service (as assembled in a railway roller bearing assembly). The seal in question was operated under normal conditions and torque and leakage were observed. At periodic intervals wear was artificially introduced by abrading. Lip force was measured periodically around the circumference of the sealing lip by the apparatus of FIG. 2. No leakage was observed until the minimum lip force dropped to a specific range as shown in FIG. 5 (.10–.12 lbs./in.). Leakage was then observed at the point of the circumference where this minimum occurred.

The plots of FIG. 5 show that the minimum lip force measurements more accurately evaluate the onset of leakage than the average measurements (such as would be determined by L.O.P. type measurements).

The data of FIGS. 6 and 6A illustrates lip force variation with position around the circumference of two seals which were operated under simulated service conditions. The force is shown as a function of the distance from the center of the circular plots. The seals tested showed excessive initial average lip force. The unusual variations shown by plots 44 and 46 were detected by the present device. Relaxation of the seal material and thermal aging (aggravated by high initial lip force) are believed to cause the lip force to drop during testing, and considerable leakage occurred. The contrast between average lip force and minimum lip force (located at the spring joint location in plot 44 are readily discernible).

It is pointed out in connection with FIG. 3 that the base member 42 is provided with interior steps or shoulders for the purpose of accommodating this size apparatus. As shown in FIG. 3, the ring 14 fits in the innermost position of the base member 42, and outwardly thereof are two steps in the base member for accommodating larger sizes of rings. Of course, it is understood that a different adapter 40 will be used if necessary, and one of the important functions of the adapter is to locate the seal assembly 12 concentrically with the ring 14. Therefore, the base 42 is provided with an axial lip for centering the adapter 40.

What is claimed is:

1. Apparatus to measure seal lip forces for determining the integrity of an elastomer circumferential bearing seal comprising:
   (a) a sleeve shaped member having an outer circumferential surface engaged by the seal lip and a gap space interrupting the continuity of said outer circumferential surface;
   (b) a circumferential ring segment in said gap space movable radially of said sleeve member to engage the seal lip;
   (c) flexible means carried by said member adjacent said gap space in position to operably mount said ring segment at said gap space in said member to permit movement thereof relative to said member;
   (d) means cooperating with said ring segment including a proving element engaged with said ring segment, said proving element being yieldable under load transmitted through said ring segment from said seal lip;
   (e) and an electrical circuit having variable resistor means connected to said proving element to respond to yielding thereof and indicate a change of voltage in said circuit in direction proportion to the seal lip force on said ring segment.

2. Apparatus to measure seal lip forces for determining the integrity of an elastomer circumferential seal comprising:
   (a) a sleeve shaped member disposed to receive said seal around its circumferential surface and having a void located in its surface to be spanned by the sealing lip of a seal positioned thereon;
   (b) a movable segment mounted substantially within said void for movement into and out of alignment with the circumferential surface of said sleeve shaped member so as to contact the spanning lip of said seal;
   (c) means operably connected to and effective for determining when said segment is circumferentially aligned with said sleeve shaped member; and
   (d) means for determining the relative requisite force required to maintain said segment circumferentially aligned with said sleeve shaped member in opposition to the urging of the sealing lip of said seal.

3. The apparatus of claim 2 wherein said means for determining the relative requisite force includes a strain yieldable proving element carried by said segment and strain gage means carried by said proving element for determining the strain yield imposed on said proving element, said strain constituting a measurement of seal lip force.

4. The apparatus of claim 2 wherein said means operably connected includes a resilient pedestal carried by said member, strain gage means on said pedestal positioned so as to be responsive to a predetermined minimum bending strain in said pedestal when said segment is aligned with said sleeve shaped member, and means for measuring the strain in said pedestal to detect the alignment of said segment with said sleeve shaped member.

5. The apparatus of claim 4 wherein said means for determining the relative requisite force includes a strain yieldable proving element carried by said segment and strain gage means for determining the strain imposed on said proving element, said strain constituting a measurement of seal lip force.

References Cited
UNITED STATES PATENTS

| | | | |
|---|---|---|---|
| 1,618,965 | 2/1927 | Herrmann | 73—120 |
| 1,760,518 | 5/1930 | Okochi et al. | 73—120 |
| 2,677,271 | 5/1954 | Faris et al. | 73—89 XR |
| 3,188,855 | 6/1965 | Dega | 73—37 |
| 3,286,512 | 11/1966 | Jagger et al. | 73—9 XR |

CHARLES A. RUEHL, Primary Examiner

U.S. Cl. X.R.

73—9, 141